United States Patent
Ericsson

(10) Patent No.: US 9,403,468 B2
(45) Date of Patent: Aug. 2, 2016

(54) FOLDABLE TAILGATE, A LOAD BED WITH SUCH A FOLDABLE TAILGATE AND A VEHICLE WITH SUCH A LOAD BED

(71) Applicant: Atlas Copco Rock Drills AB, Orebro (SE)

(72) Inventor: Johan K Ericsson, Orebro (SE)

(73) Assignee: Atlas Copco Rock Drills AB, Orebro (SE)

( * ) Notice: Subject to any disclaimer, the term of this patent is extended or adjusted under 35 U.S.C. 154(b) by 0 days.

(21) Appl. No.: 14/784,495

(22) PCT Filed: May 22, 2014

(86) PCT No.: PCT/SE2014/050632
§ 371 (c)(1),
(2) Date: Oct. 14, 2015

(87) PCT Pub. No.: WO2014/200410
PCT Pub. Date: Dec. 18, 2014

(65) Prior Publication Data
US 2016/0075267 A1 Mar. 17, 2016

(30) Foreign Application Priority Data
Jun. 13, 2013 (SE) ...................................... 1350725

(51) Int. Cl.
*B60P 1/26* (2006.01)
*B60P 1/267* (2006.01)

(52) U.S. Cl.
CPC ..................................... *B60P 1/267* (2013.01)

(58) Field of Classification Search
CPC ............. B60P 1/26; B60P 1/267; B60P 1/273

USPC .................................... 298/23 MD; 296/57.1
See application file for complete search history.

(56) References Cited

U.S. PATENT DOCUMENTS

| 634,951 A | 10/1899 | Monroe |
| 6,264,262 B1 | 7/2001 | Clonch et al. |

FOREIGN PATENT DOCUMENTS

| EP | 1914112 A1 * | 4/2008 | ............... B60P 1/26 |
| FR | 2843344 | 2/2004 | |
| JP | S 4872610 | 9/1973 | |
| JP | S 57158531 | 10/1982 | |
| WO | WO 2008030155 A1 * | 3/2008 | ............. B60P 1/006 |

* cited by examiner

*Primary Examiner* — H Gutman
(74) *Attorney, Agent, or Firm* — Mark P. Stone

(57) ABSTRACT

The invention relates to a foldable tailgate for a load bed (2), comprising a link mechanism (28) pivotally connected to the tailgate (1) and the load bed (2), at least one power means (22) connected to the load bed (2) and arranged to fold the tailgate (1) between a raised position in which the tailgate (1) at least partly covers a rear opening (16) of the load bed (2) and a lowered position in which the rear opening (16) of the load bed (2) is open. The tailgate (1) is arranged at the load bed (2) such that the tailgate (1) in a lowered position is located under the load bed (2) and such that the pivotal connection of the link mechanism with the load bed (2) ends up between the tailgate (1) and the load bed (2), and such that, in the lowered position of the tailgate (1), the tailgate (1) is arranged to rest against the underside of the load bed (2). The invention also relates to a load bed (2) with such a foldable tailgate (1) and a vehicle (4) with such a load bed (2).

20 Claims, 5 Drawing Sheets

FOLDABLE TAILGATE, A LOAD BED WITH SUCH A FOLDABLE TAILGATE AND A VEHICLE WITH SUCH A LOAD BED

BACKGROUND OF THE INVENTION AND PRIOR ART

The present invention relates to a foldable tailgate for load beds at a mining dumper according the preamble of claim 1. The invention also relates to a load bed with such a foldable tailgate according to the preamble of claim 9. The invention also relates to a vehicle with such a load bed according to the preamble of claim 11.

Foldable tailgates to load beds and cargo vehicles are previously known. Such tailgates are pivotally mounted in two or more points at the load bed and may be automatically foldable. It is also known to arrange downward-going tailgates on load beds. The tailgates often have a hinge welded to the outermost rear edge of the load bed and are opened with a linkage, which is mounted on the tailgate.

There are also tailgates which open upwards as they usually are hinged in the upper edge of the load bed and are controlled in the same way.

In the mining equipment, there is also a combination of these tailgates, namely two part tailgates where one opens upwards and one opens downwards.

One problem with tailgates that open downwards and are hinged in the outermost rear edge of the load bed is that the tailgate decreases the clearance when tilting and since it during tilting is closer to the ground than the trailing edge of the load bed. This mainly applies if the load bed protrudes backwards after the fulcrum of the load bed, causing the rear portion of the load bed to form an overhang. A large overhang is common on mining trucks for underground use. In the event that the tailgate is provided with a linkage at the rear edge of the load bed, the linkage may be damaged at tilting if it comes into contact with the ground or with objects lying on the ground.

The problem with tailgates which open upwards is that an obstruction for the load is formed, since the tailgate and its linkage are arranged transversely across the upside of the load bed. This causes the load to hit parts of the tailgate during tilting, which results in great stress on the tailgate, which thus may break down.

The document U.S. Pat. No. 3,322,464 A shows a truck with a load bed, which is provided with a foldable tailgate. A hydraulic cylinder is arranged to pivot the tailgate between an open and closed position. In the open position, the tailgate protrudes backwards from the load bed.

The document SE391898 B shows a foldable tailgate for a vehicle platform. The tailgate comprises a lower and upper tailgate. An articulated coupling is arranged between the lower tailgate and the platform. A hydraulic cylinder connected to the platform and the articulated coupling is arranged to pivot the lower tailgate between an open and closed position. In the open position, the lower tailgate is projecting backwards from the platform and forms an enlargement of the platform surface.

In order to empty a load bed of, for example, a mining dumper, the load bed is provided with a controlled tailgate arranged to be moved between a closed and an open position. The load bed may be either tiltably or fixedly arranged at the mining dumper. When the load bed is fixedly arranged at the mining dumper an ejector gate located at the front end of the load bed is arranged to push the load of the load bed, when the controlled tailgate is in its open position. A common denomination for such a load bed is ejector bed.

Especially at a type of mining dumper, which is provided with a fixed load bed and which is utilized when unloading in areas with low height, where a tilting load bed is not possible to use, the controlled tailgate moves downwards towards the rear wheels, when the same is opened for unloading the contents.

When opening the controlled tailgate at a mining dumper with a fixed load bed of the above mentioned type, a problem arises in that the available movement distance at opening of the controlled tailgate is limited, that is, the height from the ground to the bottom of the load bed is limited. This means that the load which may be loaded onto the load bed will be limited by the height of the controlled tailgate.

The sides of the load bed are usually higher than the height of the controlled tailgate in its closed position. The rear portion of the sides of the load bed therefore usually slopes obliquely backwards towards the upper edge of the controlled tailgate, wherein a dead space occurs where no load can be placed.

One way to reduce this problem is to configure the controlled tailgate in the form of a circular arc and allowing a part of the lower portion of the arc-shaped, controlled tailgate to move in between the rear pair of wheels of the mining dumper with fixed load bed. This way, the height of the controlled tailgate may be increased and the load capacity of the load bed may thus be increased. The height of the tailgate will however remain lower than the sides of the load bed. The tailgate is opened and closed by means of hydraulic cylinders arranged on both outer sides of the load bed, which are both connected to the sides of the load bed and to the tailgate. The location of the hydraulic cylinders on the outer sides of the load bed does however mean that they may be subjected to stress and break down if the load bed is, for example, used in a mine adit and the cylinders ram into the walls of the adit.

The document SE530295 B shows a mechanical tailgate for load beds where the opening and closing movement of the tailgate is in the form of a circular movement. In the open position the tailgate is located under the load bed. The opening and closing of the tailgate is achieved by means of hydraulic cylinders arranged on both sides of the load bed. The load bed is provided with a push plate, which pushes the load out of the load bed.

SUMMARY OF THE INVENTION

Given the background above there is a need for further develop a foldable tailgate and a load bed with such a foldable tailgate.

The object of the present invention is to provide a foldable tailgate allowing increased ground clearance during tilting when mounted on a load bed.

A further object of the invention is to provide a foldable tailgate, which, when tilting a load bed, protects a linkage mechanism connected to the tailgate and the load bed.

Yet another object of the invention is to provide a foldable tailgate which, when tilting a load bed, protects a power means arranged for folding the tailgate.

Yet another object of the invention is to provide a foldable tailgate which, when tilting a load bed, does not end up into the pile of the material being tipped from the load bed.

Yet another object of the invention is to provide a foldable tailgate which, when tilting a load bed, does not obstruct the tilting of the load bed.

Yet another object of the invention is to provide a foldable tailgate which has a modularization and may thereby be mounted on load beds of different shapes and sizes.

Yet another object of the invention is to provide a foldable tailgate which requires a small movement when being lowered and raised at a load bed.

These objects are achieved with a foldable tailgate of the initially mentioned kind, which is characterized by the features specified in claim 1. These objects are also achieved with a load bed of the initially mentioned kind, which is characterized by the features specified in claim 9. These objects are also achieved by a vehicle of the initially mentioned kind, which is characterized by the features specified in claim 11.

By arranging the tailgate at the load bed, such that it in the lowered position is located under the load bed and such that the pivotal connection of the linkage mechanism with the load bed ends up between the tailgate and the load bed, the tailgate will in the lowered position protect the pivotal connection of the link mechanism with the load bed, which means that the tiltable function of the tailgate is ensured.

The tailgate being arranged to rest against the underside of the load bed ensures a large ground clearance when tilting the load bed, while the linkage mechanism and the power means are stress-relieved at high loads on the tailgate. Such high load on the tailgate in the lowered position may occur when the load bed is in a tilted position and when the load bed and the tailgate rest on the ground or on an object lying on the ground.

According to an embodiment the power means is connected with the linkage mechanism such that the connection of the power means with the linkage mechanism ends up between the tailgate and the load bed when the tailgate is in a lowered position. The tailgate will, in the lowered position, thereby protect the connection of the power means with the linkage mechanism, which means that the tiltable function of the tailgate is ensured.

According to a further embodiment the linkage mechanism comprises a first and a second link arm, which are each pivotally connected to the tailgate and the load bed. This results in that the movement of the tailgate between the raised and the lowered position may be given an advantageous movement where the pivot of the tailgate about an axis coinciding with the longitudinal direction of the tailgate is minimized. The time to lower the tailgate may thus be minimized and the stroke of the power means for lowering the tailgate is minimized.

According to a further embodiment the first link arm has a substantial extension in the longitudinal direction of the tailgate. The stability of the linkage mechanism is thus increased, which means that the power means may be dimensioned to only exert and carry forces in one direction. It is thus sufficiently to arranged only one power means in the form of, for example, a hydraulic cylinder between the load bed and the first link arm.

According to a further embodiment the second link arm comprises two link arms configured on each side of the first link arm. The possibility to use the tailgate on load beds of different shapes and sizes is thus increased. The other link arms may be positioned at a distance to the first link arm, which distance is adapted to the shape and size of the load bed.

According to a further embodiment two power means are arranged to fold the tailgate, which power means are connected to the respective second link arm. Depending on the shape and size of the load bed, the power means may thus be arranged such that they protrude a minimal or non-existent distance under the load bed. Such a solution is advantageous if the load bed is fixedly arranged at a vehicle and is the ejector bed type, since it is desired to arrange an ejector bed as low as possible above the ground.

Further advantages of the invention are apparent from the following detailed description.

BRIEF DESCRIPTION OF THE DRAWINGS

In the following, as examples, preferred embodiments of the invention are described with reference to the accompanying drawings, in which.

DETAILED DESCRIPTION OF PREFERRED EMBODIMENTS OF THE INVENTION

Figure 1:
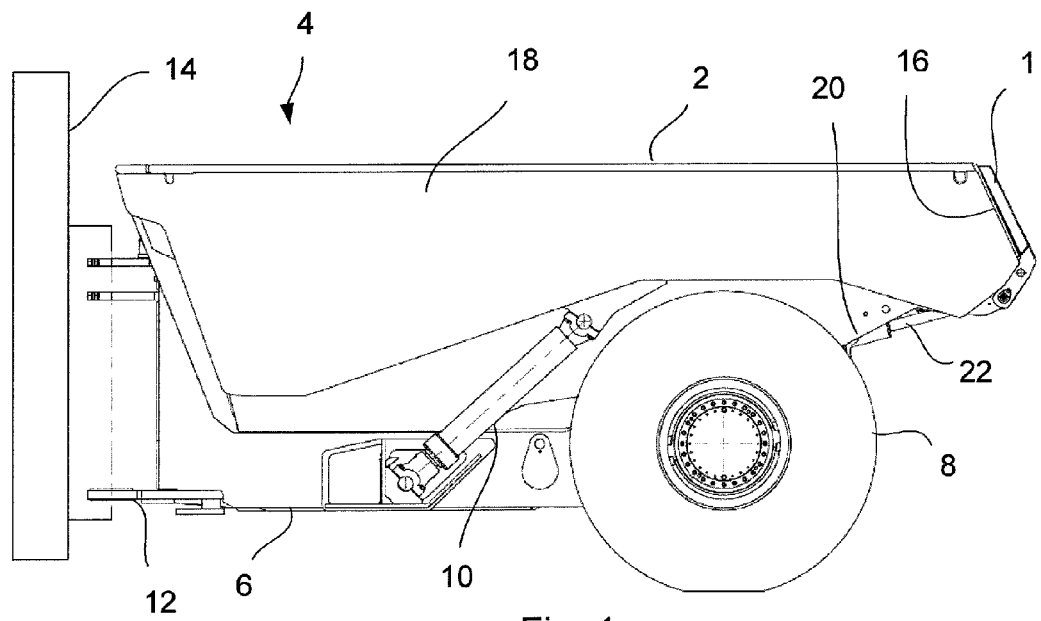
FIG. 1 shows a side view of a foldable tailgate for a load bed according to a first embodiment of the present invention.

FIG. 1 shows a side view of a foldable tailgate 1 for a load bed 2 according to a first embodiment of the present invention. The load bed 2 is arranged on a wheeled vehicle 4 in the form of a trailer, having a chassis 6 with two wheels 8. The load bed 2 is tiltable journalled on the chassis 6 and may be moved to a load position and to a tilted position by means of tilt cylinders 10 arranged one at each side of the chassis 6, which tilt cylinders 10 are connected to the chassis 6 and the load bed 2. The wheeled vehicle 4 in the form of a trailer is also provided with a coupling device 12 for coupling with a towing vehicle 14, which is shown schematically in FIG. 1. The load bed 2 with the foldable tailgate 1 according to the invention may also be arranged directly on a loading vehicle such as a truck or a mining dumper used in mining. FIG. 1 shows the tailgate 1 in a raised position when the load bed 2 is in a load position. In the raised position, the tailgate 1 covers a rear portion in the form of a rear opening 16 of the load bed 2, which opening 16 is defined by the side walls 18 of the load bed 2 and a bottom wall 20. In the raised position, the task of the tailgate 1 is to prevent the load in the load bed from falling of the load bed 2.

When the load bed 2 is to be emptied the tilting cylinders 10 are activated to raise the load bed 2 to a tilted position. In order for the load to leave the load bed 2, the tailgate 1 must be folded to a lowered position, such that the rear opening 16 of the load bed 2 is opened. At least one power means 22 is connected to the load bed 2 and is arranged to fold the tailgate 1 between the raised and the lowered position. The power means 22 may be a hydraulically or pneumatically controlled cylinder, or be an electrically controlled power means.

Figure 2:
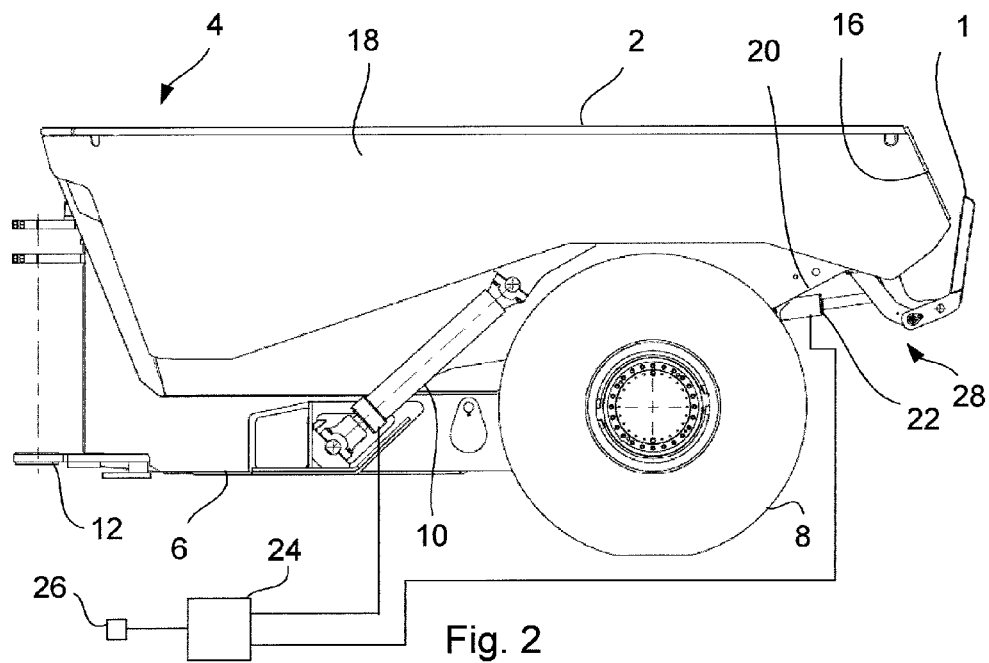
FIG. 2 shows a side view of the foldable tailgate for a load bed according to the first embodiment of the present invention.

FIG. 2 shows a side view of the load bed 2 with the foldable tailgate 1 according to the first embodiment of the present invention. In FIG. 2, the tailgate 1 has started to be folded into a lowered position. The tailgate 1 is thus in a position between the raised and the lowered position. A link mechanism 28 is pivotally connected to the tailgate 1 and the load bed 2, so that the tailgate 1 can be pivoted with a predetermined movement between the raised and the lowered position. In connection with the start of the folding of the tailboard 1 the tilting of the load bed 2 will be started.

The tilting of the load bed 2 and the folding of the tailgate 1 is preferably performed automatically and synchronously by an operator actuating a control unit 24 through a switch 26. When the load bed 2 is to be tilted the operator affects the switch 26, so that the control unit 26 activates the tilt cylinders 10 and the power means 22 for folding the tailgate 1. The return of the load bed 2 to the load position and the folding of the tailboard 1 to the raised position is preferably performed automatically and synchronously by the operator affecting the control unit 24 through the switch 26. When the load bed 2 is to be lowered to load positions the operator affects the switch 26 so that the control unit 26 activates the tilt cylinders 10 and the power means 22 for lowering the load bed 2 and raising the tailgate 1.

Figure 3:
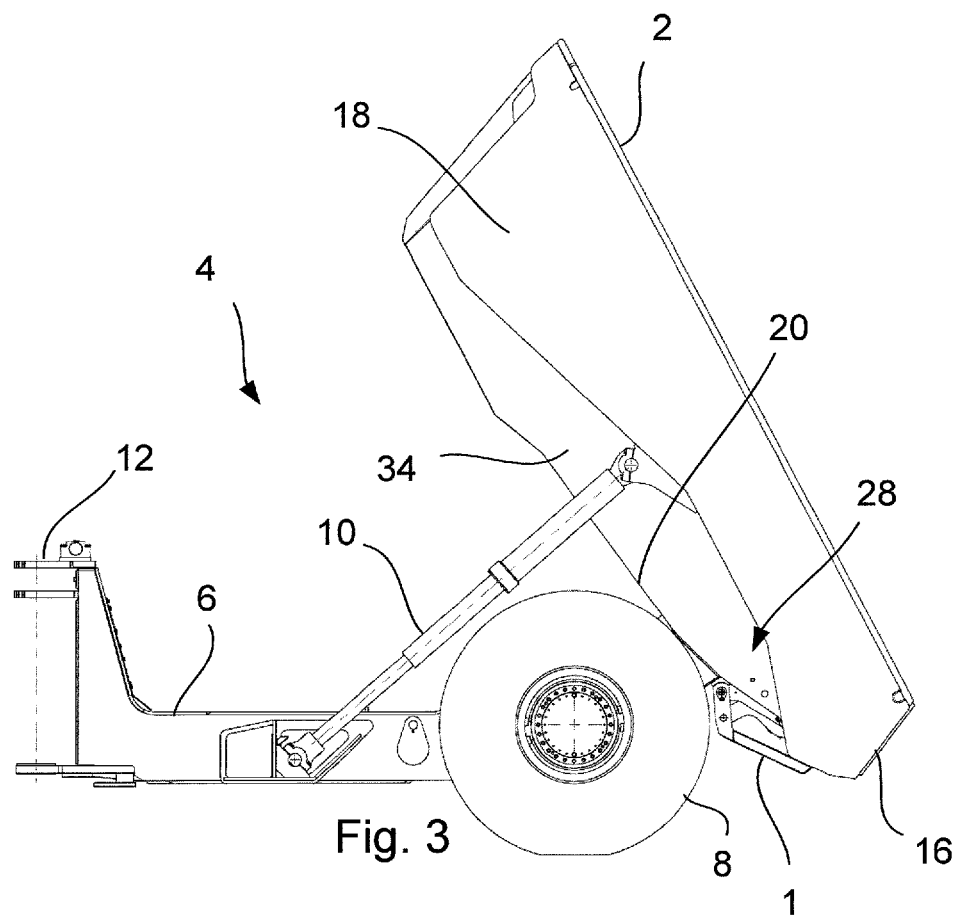
FIG. 3 shows a side view of the foldable tailgate for a load bed according to the first embodiment of the present invention.

FIG. 3 shows a side view of the load bed 2 with the foldable tailgate 1 according to the first embodiment of the present invention. In FIG. 3, the load bed 2 is in a tilted position and the tailgate 1 is in a lowered position. The tailgate 1 is arranged at the load bed 2, such that the tailgate 1 in the lowered position is located under the load bed 2, and such that the pivotal connection of the link mechanism 28 with the load bed 2 is located between the tailgate 1 and the load bed 2. The expression "under" the load bed 2 means under the bottom wall 20 of the load bed 2. By arranging the tailgate 1 at the load bed 2, such that it in the lowered position is located under the load bed 2 and such that the pivotal connection of the link mechanism 28 with the load bed 2 ends up between the tailgate 1 and the load bed 2, the tailgate 1 will, in the lowered position, protect the pivotal connection of the link mechanism 28 with the load bed 2, which results in the tiltable function of the tailgate 1 being secured. As shown in FIG. 3, the tailgate 1 is arranged to rest against the underside of the load bed 2. This ensures a high ground clearance when tilting the load bed 2. At the same time the link mechanism 28 and the power means 22 are stress-relieved at high load on the tailgate 1. Such a high load on the tailgate 1 in the lowered position may occur when the load bed 2 is in the tilted position and when the load bed 2 and the tailgate 1 rest on the ground or on an object lying on the ground. Also the tailgate 1 itself is stress-relieved when it in the lowered position abuts the underside of the load bed 2, which means that the risk that the tailgate is deformed at high load decreases.

Figure 4:
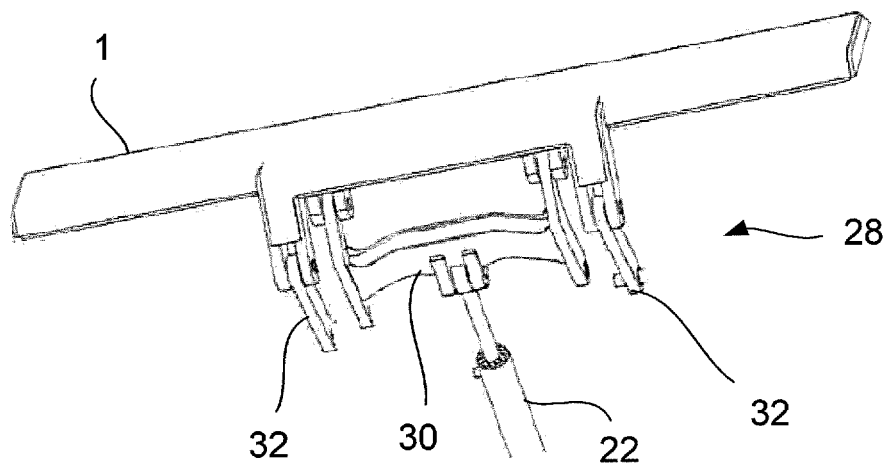
FIG. 4 shows a perspective view of the foldable tailgate for a load bed according to the first embodiment of the present invention.

FIG. 4 shows a perspective view of the foldable tailgate 1, the link mechanism 28 and the power means 22. As shown in FIG. 4 the link mechanism 28 comprises first and second link arms 30, 32, each pivotally connected to the tailgate 1 and the load bed 2. This entails that the movement of the tailgate 1 between the raised and the lowered position can be given an advantageous movement where the pivot of the tailgate 1 around an axis, which coincides with the longitudinal direction of the tailgate 1, is minimized. Thus, the time for folding the tailgate 1 is minimized and the stroke of the power means 22 to perform the folding of the tailgate 1 is minimized. It is also apparent from FIG. 4 that the first and second link arms 30, 32 have different lengths. Preferably, the first link arm 30 which is connected to the power means 22 is longer than the second link arms 32. Thus, the distance between the fixing points on the load bed 2 and the tailgate 1 is larger for the first link arm 30 compared to the distance of the corresponding fixing points for the second link arms 32. This length ratio between the first and second link arms 30, 32 causes the advantageous movement of the tailgate 1 between the raised and the lowered position. The first and second link arms 30, 32 form a four joint mechanism with their bearing points in the load bed 2 and the tailgate 1.

The power means 22 is connected to the link mechanism 28 so that the connection of the power means 22 with the link mechanism 28 ends up between the tailgate 1 and the load bed 2 when the tailgate 1 is lowered. Thus, the tailgate 1 will in the lowered position protect the connection of the power means 22 with the link mechanism 28, so that the folding functionality of the tailgate 1 is ensured. The first link arm 30 has a substantial extension in the longitudinal direction of the tailgate 1. This increases the stability of the link mechanism 28 and the power means 22 may be dimensioned to only exert and carry forces in one direction, which means that only one power means 1 in the form of for example a hydraulic cylinder may be arranged between the load bed 2 and the first link arm 30.

The second link arm 32 comprises two on each side of the first link arm configured link arms. This increases the ability to use the tailgate 1 on load beds 2 of various shapes and size. The second link arms 32 may be positioned in an arbitrary distances to the first link arm 30, which distance is adapted to the shape and size of the load bed 2.

Figure 5:
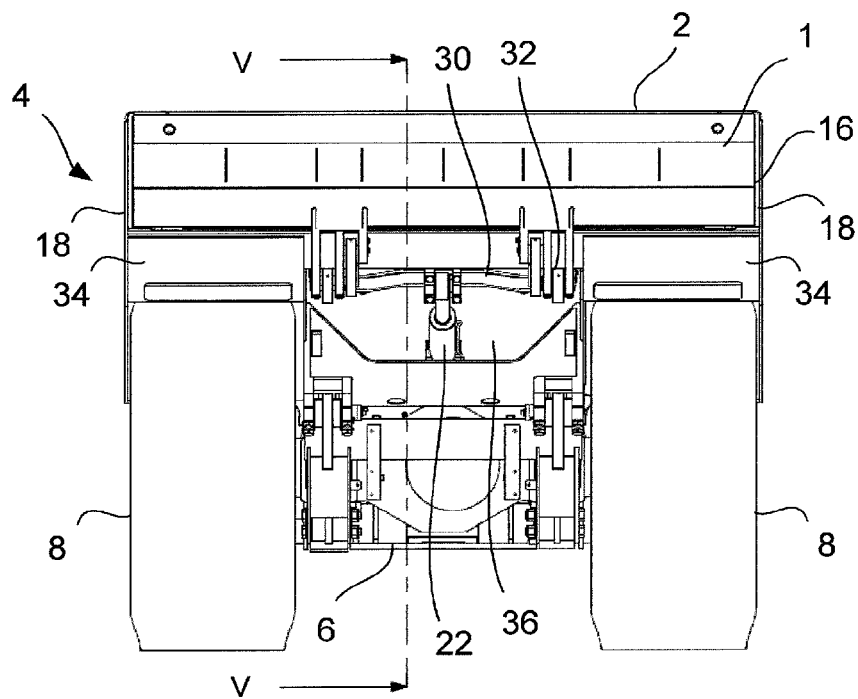
FIG. 5 shows a rear view of the load bed with the foldable tailgate according to the first embodiment of the present invention.

FIG. 5 shows a rear view of the load bed 2 with the foldable tailgate 1 according to the first embodiment of the present invention. It is apparent from FIG. 5 how the power means 22 is connected to the first link arm 30 and in the middle of this arm. On both sides of the first link arm 30, the second link arms 32 are arranged. The tailgate 1 is shown in the raised position and covers the rear portion in form of the rear opening 16 of the load bed 2. The tailgate 1 thus has a shape and size which substantially corresponds to the rear opening of the load bed 2, which is defined by the side walls 18 and bottom wall 20 of the load bed 2. The load bed 2 has a width which substantially corresponds with the width between the outer surfaces of the wheels 8. To avoid conflict between the load bed 2 and the wheels 8 the load bed 2 is configured with recesses 34 having a size adapted to the size of the wheels 8.

Figure 6:
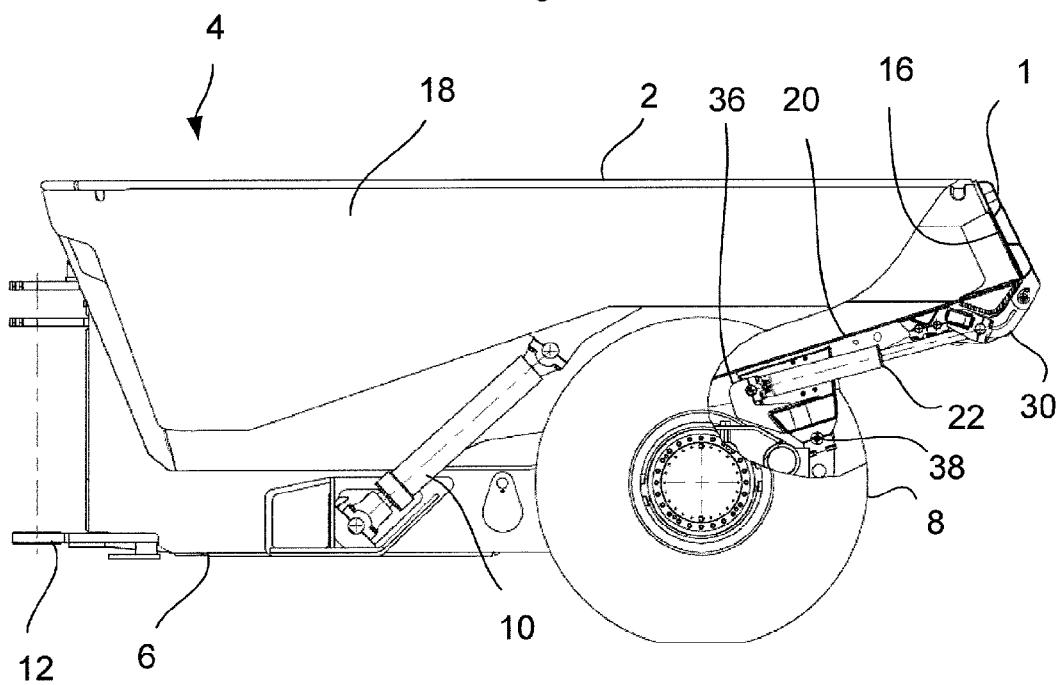
FIG. 6-8 show sectional views through the line V-V in FIG. 5.
Figure 7:
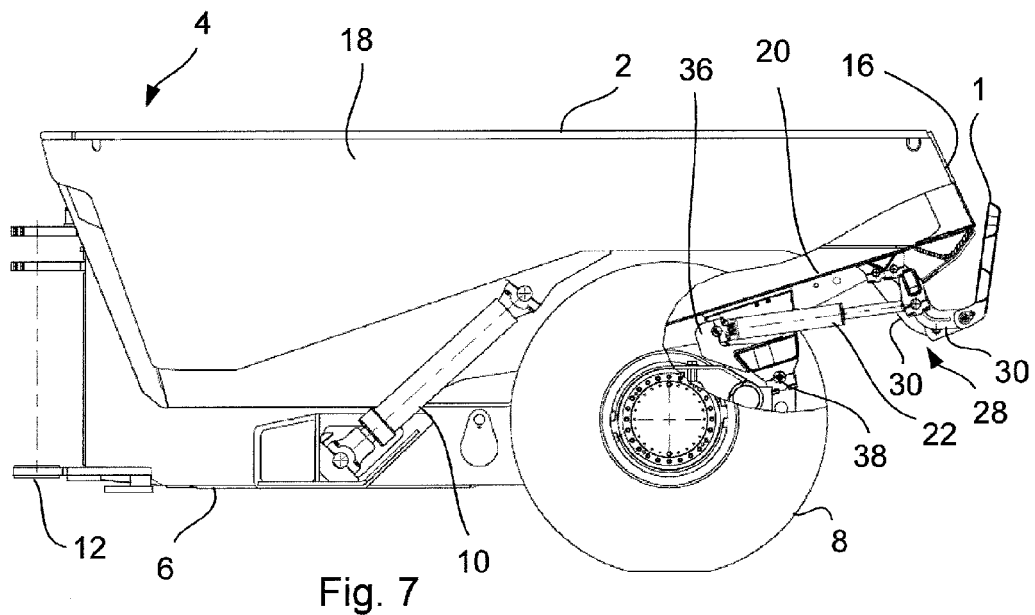
Figure 8:
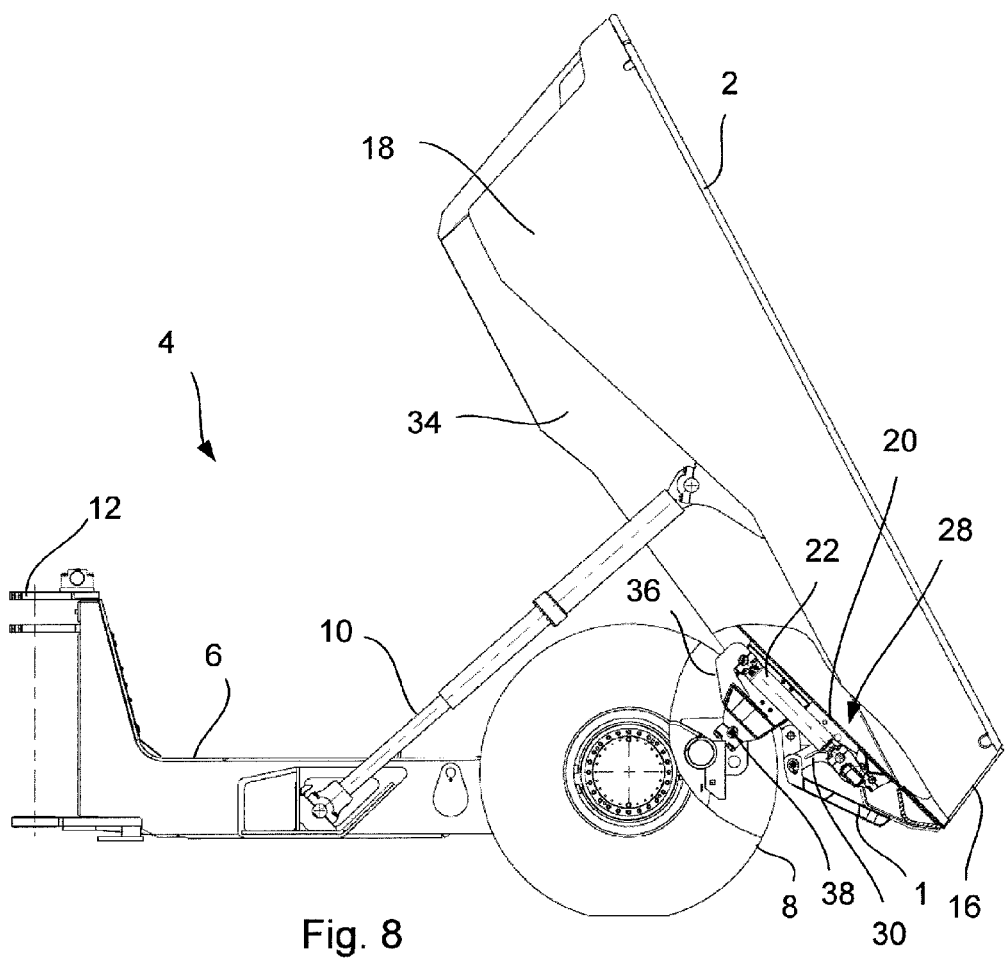

The FIGS. 6-8 show sectional views along line V-V in FIG. 5 for different positions of the load bed 2 and the tailgate 1. FIG. 6 shows the tailgate 1 in a raised position when the load bed 2 is in the load position and where the tailgate 1 covers the rear opening 16 of the load bed 2. It is apparent how the power means 22 in the form of a hydraulic cylinder is connected to the load bed 2 and the first link arm 30. It is also apparent that the power member 22 is connected to a bracket 36 on the underside of the load bed 2. The bracket 36 extends from the underside of the load bed 2 and is connected to the chassis 6 via a pivot joint 38. During tilting of the load bed 2 the load bed 2 will pivot about the pivot joint 38.

In FIG. 7, the tailgate 1 has started to be folded to a lowered position. The power means 22 has been activated and pulled the first link mechanism 30 in the direction of the attachment of the power means 22 with the load bed 2. Both the first link arm 30 and the second link arms 32 have thus begun to pivot about its attachment points with the underside of the load bed 2. The tailgate 1 has thus followed the pivotal movement that the first link arm 30 and the second link arms 32 have performed. From FIG. 7 is also apparent how the first link arm 30 and the second link arms 32 are pivotally connected to the tailgate 1. During folding of the tailgate 1 the tailgate 1 will in a first stage perform a pivotal movement in a downward direction relative to the load bed 2, and in a final stage of the folding continue the pivotal movement in an upward movement towards the underside of the load bed 2.

In FIG. 8, the load bed 2 is in the tilted position and the tailgate 1 is in a lowered position. The power means 22 has further pulled the first link mechanism 30 in the direction of the attachment of the power means 22 with the load bed 2, such that the tailgate 1 is in the lowered position located under the load bed 2. It is apparent from FIG. 8 how the pivotal connection of the link arms 30, 32 with the load bed 22 and the pivotal connection of the power means 22 with the first link arm 30 ends up between the tailgate 1 and the load bed 2, wherein the tailboard 1 covers and protects the pivotal connection of the link arms 30, 32 with the load bed 2 and the pivotal connection of the power means 22 with the first link arm 30 against external impact from the ground or from objects lying on the ground. As shown in FIG. 8, at least a part of the surface of the tailgate 1 facing the load bed 2 is arranged to rest against the underside of the load bed 2 in the lowered position of the tailgate 1.

Figure 9:
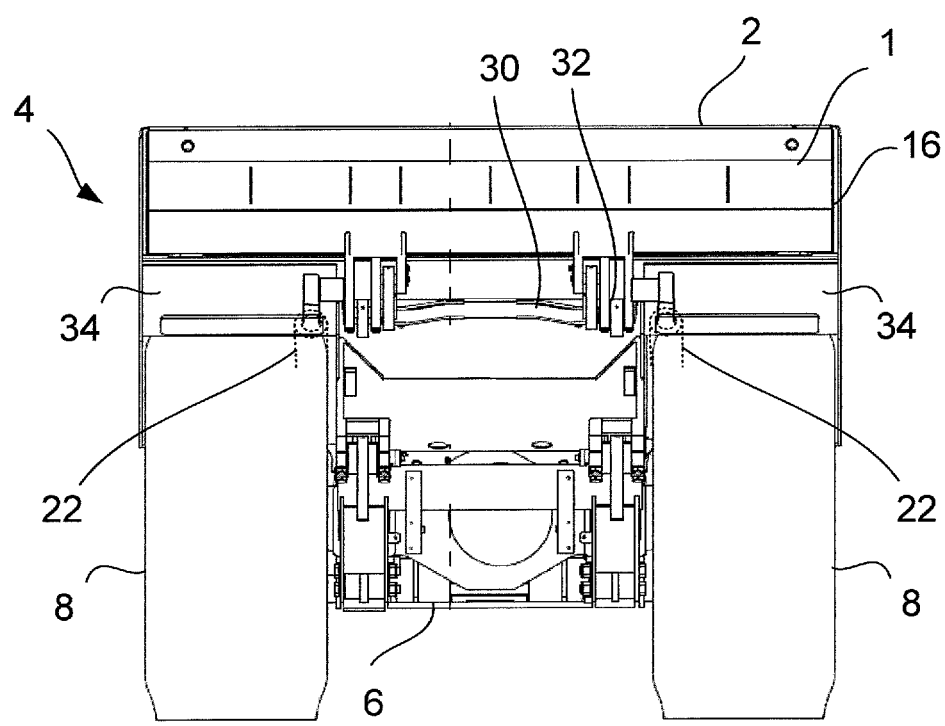
FIG. 9 shows a rear view of a fixed load bed with the foldable tailgate according to the invention.

FIG. 9 shows a rear view of a load bed 2 which is fixedly arranged on the chassis 6 and which load bed 2 is thus not tiltable. To fold the tailgate 1, two power means 22 are arranged, which power means 22 are connected to the respective second link arm 32. Thus, depending on the shape and size of the load bed 2, the power means 22 may be arranged so as to protrude a minimal or no distance under the load bed 2. Such a solution is advantageous when the load bed 2 is fixedly arranged at the chassis and is of the ejector bed type, as it is desirable to arrange an ejector bed as low as possible above the ground. The power means 22 may according to this embodiment be connected to the load bed 2 in the space formed between the respective wheel 8 and the respective side of the load bed 2 in the recesses 34. Thus, the wheels 8 will protect the power means 22 against external impact from for example protruding rock portions in a mine adit when the load bed 2 is advanced in the mine adit.

The components and features stated above may within the scope of the invention be combined between different available embodiments.

The invention claimed is:

1. A foldable tailgate for a load bed (2), comprising
a link mechanism (28) pivotally connected to the tailgate (1) and the load bed (2), at least one power means (22) connected to the load bed (2) and arranged to fold the tailgate (1) between a raised position in which the tailgate (1) at least partly covers a rear opening (16) of the load bed (2) and a lowered position in which the rear opening (16) of the load bed (2) is open,
wherein:
the tailgate (1) is arranged at the load bed (2) such that the tailgate (1) in a lowered position is located under the load bed (2) and such that the pivotal connection of the link mechanism with the load bed (2) ends up between the tailgate (1) and the load bed (2), and wherein, in the lowered position of the tailgate (1), the tailgate (1) is arranged to rest against the underside of the load bed (2).

2. A tailgate according to claim 1, wherein the at least one power means (22) is connected to the link mechanism (28).

3. A tailgate according to claim 2, wherein the connection of the at least one power means (22) with the link mechanism (28) ends up between the tailgate (1) and the load bed (2) when the tailgate (1) is in the lowered position.

4. A tailgate according to claim 1, wherein the link mechanism (28) comprises first and second link arms (30, 32), which are each pivotally connected to the tailgate (1) and the load bed (2).

5. A tailgate according to claim 4, wherein the first link arm (30) has a substantial extension in the longitudinal direction of the tailgate (1).

6. A tailgate according to claim 4, wherein the power means (22) is connected to the first link arm (30).

7. A tailgate according to claim 4, wherein the second link arm (32) comprises two link arms configured on each side of the first link arm (30).

8. A tailgate according to claim 7, wherein two power means (22) are arranged to fold the tailgate (1), which power means (22) are connected to respective second link arm (32).

9. A load bed (2), wherein said load bed comprises a foldable tailgate (1) according to claim 1.

10. A load bed according to claim 9, wherein the load bed (2) is tiltable.

11. Vehicle (4), wherein said vehicle comprises a load bed (2) according to claim 9.

12. Vehicle according to claim 11, wherein the vehicle (4) is a wheeled vehicle of the type truck, trailer or mining dumper.

13. A tailgate according to claim 5, wherein the power means (22) is connected to the first link arm (30).

14. A tailgate according to claim 5, wherein the second link arm (32) comprises two link arms configured on each side of the first link arm (30).

15. A tailgate according to claim 6, wherein the second link arm (32) comprises two link arms configured on each side of the first link arm (30).

16. A load bed (2), wherein said load bed comprises a foldable tailgate (1) according to claim 2.

17. A load bed (2), wherein said load bed comprises a foldable tailgate (1) according to claim 3.

18. A load bed (2), wherein said load bed comprises a foldable tailgate (1) according to claim 4.

19. A load bed (2), wherein said load bed comprises a foldable tailgate (1) according to claim 5.

20. Vehicle (4), wherein said vehicle comprises a load bed (2) according to claim 10.

* * * * *